United States Patent
Lee et al.

(10) Patent No.: US 10,229,450 B2
(45) Date of Patent: Mar. 12, 2019

(54) GENERATING SALE TRANSACTIONS FROM VOICE DATA INPUT BY A USER

(71) Applicant: PAYPAL, INC., San Jose, CA (US)

(72) Inventors: Hyunju Lee, Singapore (SG); Joel P. Yarbrough, Oakland, CA (US); Francisco Vittorio Octavio Joachin D. Barretto, Singapore (SG); Gokul G Narayana Pillai, Chennai (IN)

(73) Assignee: PAYPAL, INC., San Jose, CA (US)

( * ) Notice: Subject to any disclaimer, the term of this patent is extended or adjusted under 35 U.S.C. 154(b) by 1088 days.

(21) Appl. No.: 14/296,165

(22) Filed: Jun. 4, 2014

(65) Prior Publication Data
US 2015/0095188 A1     Apr. 2, 2015

Related U.S. Application Data

(60) Provisional application No. 61/885,864, filed on Oct. 2, 2013.

(51) Int. Cl.
G06Q 30/06      (2012.01)
(52) U.S. Cl.
CPC ................. G06Q 30/0633 (2013.01)
(58) Field of Classification Search
CPC .......................................... G06Q 30/06–30/08
USPC ................................................. 705/26.1–27.2
See application file for complete search history.

(56) References Cited

U.S. PATENT DOCUMENTS

2007/0150286 A1*  6/2007  Miller ................... G10L 15/30
                                                        704/270.1
2011/0246306 A1* 10/2011  Blackhurst ............ G06Q 30/02
                                                        705/14.58

OTHER PUBLICATIONS

Why Paypal makes it a chore to pay by credit card, John Wedding, Apr. 16, 2008, available at http://www.mightybargainhunter.com/why-paypal-makes-it-a-chore-to-pay-by-credit-card/.*
"Nordstrom Links Online Inventory to Real World" by Stephanie Clifford, New York Times Aug. 23, 2010, available at: http://www.nytimes.com/2010/08/24/business/24shop.html.*

* cited by examiner

*Primary Examiner* — Ming Shui
(74) *Attorney, Agent, or Firm* — Haynes and Boone, LLP

(57) ABSTRACT

There is provided systems and method for generating sale transaction from voice data input by a user. A user device may receive voice data including a preference for purchasing an item. The user device may convert the voice data to the preferences and perform a search for a sales transaction corresponding to the preferences. The search may include parameters about the user, such as a location. The sales transaction may include purchase prices, times, locations, or other relevant data. A user may accept or decline the sales transaction with additional user data. If the user accepts the sales transaction, the sales transaction may be completed with a payment provider and a transaction history given to the user for later redemption of the item. If the user declines the sales transaction, further sale transactions with additional items may be present to the user.

20 Claims, 4 Drawing Sheets

GENERATING SALE TRANSACTIONS FROM VOICE DATA INPUT BY A USER

CROSS-REFERENCE TO RELATED APPLICATIONS

Pursuant to 35 U.S.C. § 119(e), this application claims priority to the filing date of U.S. Provisional Patent Application 61/885,864, filed Oct. 2, 2013, which is incorporated by reference in its entirety.

TECHNICAL FIELD

Example embodiments of the present application relate generally to generating sale transactions from voice data input by a user, and more specifically to receiving voice data from a user, determining a sale transaction from the voice data, and completing the sale transaction or refining the sale transaction based on further user input.

BACKGROUND

User devices may include device applications, which may provide online shopping and payment features. For example, a user may utilize one or more device applications to search for an item, provide payment, and enter delivery or pick up information. Device applications may include interfaces tailored to specific input, transactions, and/or other executable processes. Thus, multiple application interfaces may require users to enter in a multitude of different information for each process (e.g., item search, payment, etc.), thereby requiring a large amount of input and time to complete a single transaction. Additionally, one application may not have access to a complete range of relevant information for a user, such as a most compatible merchant and/or a nearby merchant location. Users may have difficulty navigating new interfaces, or may be in a situation where they cannot type in information, such as driving a car. Moreover, users may have to enter user financial information for each transaction, exposing the user to risk and creating additional work for the user.

Figure 1:
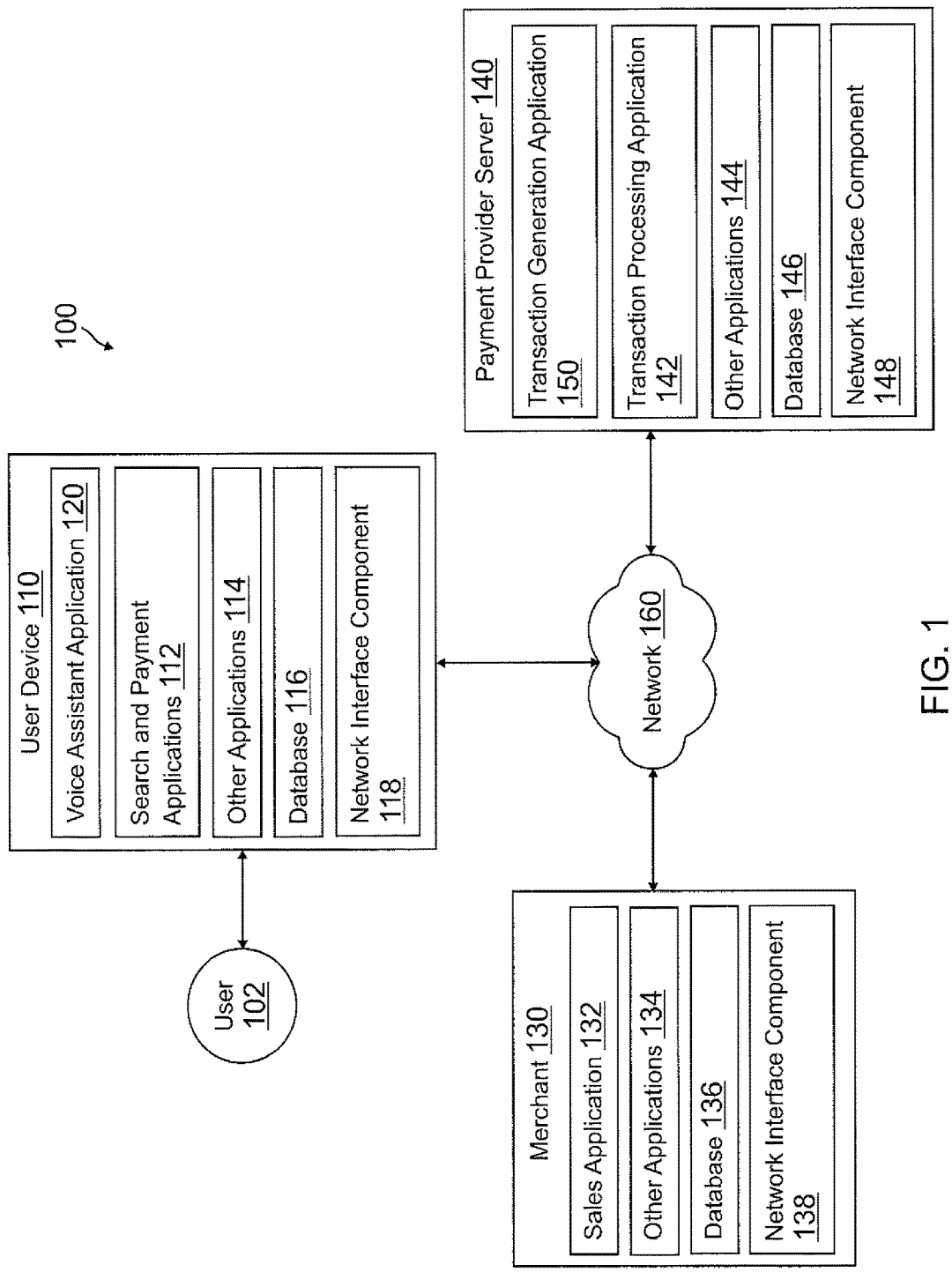
FIG. 1 is a block diagram of a networked system suitable for implementing the process described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods that present sale transactions for an item using voice data from a user. Systems suitable for practicing methods of the present disclosure are also provided.

In certain embodiments, a user may utilize a voice assistance application of a user device that has voice recognition features to input voice data. The voice data may include purchase preferences, for example, a preference for one or more items (e.g., merchandise, goods, services, admission tickets, etc.). In one embodiment, the user may state, "I want to see movie A tonight." Items may correspond to other goods and/or services at a merchant, such as a food item at a merchant location, a preordered item, an event ticket, a service request, or any other purchasable item. The user may input the voice data when starting and/or operating the application or may input the voice data through commands when the application is executing in the background of an operating system of the user device. Additionally, the voice assistance application may pull other parameters of the user from various applications and/or databases of the user device. In other embodiments, parameters, such as user personal/financial information, may be stored on a server database, such as with user account information for the user.

The user device may execute a search process to determine a sales transaction from the voice data's purchase preference and the additional parameters for the user. The sales transaction may include an item corresponding to the purchase preference that is for sale from a merchant. Thus, in the previous example, the sales transaction may include the movie A and times for the movie A. In various embodiments, the parameters for the user, such as location, monetary preferences, other users with the user, etc., may be utilized to find merchants offering the item that more closely matches the user. Thus, the movie A and times for the movie may be presented with a merchant location corresponding to a location of the user. However, the user may also input a location, such as through a stored user location in a database of the user device or held by a server, and/or through additional user input, including additional user voice data. The sales transaction may then be presented to the user.

The user may choose to accept the sales transaction. Acceptance of the sales transaction may be made by a voice command, such as a "Purchase" voice command. Additionally, the acceptance may include other voice commands for preferences. For example, the user may further state, "Purchase two tickets at 9:15 PM." Utilizing the additional voice commands, the sales transaction may be updated and offered to the user. For example, if the user requests two tickets, the sales transaction may update to show a price and a payment/checkout option for the two tickets.

However, if after receiving the additional voice command, the requested item is not available from the merchant, the user may be offered a new sales transaction. For example, if the user requests two tickets at 9:15 PM but movie A only has one available ticket at that time, a new sales transaction with another merchant or at another time for the two tickets may be offered to the user. Once the user has selected a sales transaction for purchase, the user may complete payment for the tickets using stored financial information. In other embodiments, the user may complete payment through a payment provider. The user may choose and/or enter the payment information through further voice commands (e.g., "Pay using VISA® card stored in my digital wallet" or "pay using my payment account with payment provider X").

Additionally, if the user declines to complete the sales transaction, for example using a "No" command or requesting a new search, another sales transaction may be offered to the user including a different item for purchase, or the same item with different details. For example, if the user refuses to see Movie A at the first offered merchant/merchant location or at the first offered time, a new merchant/merchant location or a new time may be incorporated into a new sales transaction. Thus, a different item for purchase may include different movies playing that night or different theaters playing the movie, while the same or similar item for purchase may include a food menu of similar items, a goods/service list from the merchant, or other item purchasable at the merchant.

FIG. 1 is a block diagram of a networked system 100 suitable for implementing the process described herein according to an embodiment. As shown, system 100 may comprise or implement a plurality of devices, servers, and/or software components that operate to perform various methodologies in accordance with the described embodiments. Exemplary device and servers may include device, stand-alone, and enterprise-class servers, operating an OS such as a MICROSOFT® OS, a UNIX® OS, a LINUX® OS, or other suitable device and/or server based OS. It can be appreciated that the devices and/or servers illustrated in FIG. 1 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

System 100 includes a user 102, a user device 110, a merchant 130, and a payment provider server 140 in communication over a network 160. User 102, such as a consumer, may utilize user device 110 to enter voice data corresponding to user purchase preferences, and receive sales transactions with items corresponding to the user purchase preferences. User 102 may utilize payment provider server 140 to complete a sales transactions and may visit merchant 130 to pick-up/redeem item purchases from the sales transaction.

User device 110, merchant 130, and payment provider server 140 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 160.

User device 110 may be implemented using any appropriate hardware and software configured for wired and/or wireless communication with merchant 130 and/or payment provider server 140. For example, in one embodiment, user device 110 may be implemented as a personal computer (PC), a smart phone, laptop computer, wristwatch with appropriate computer hardware, eyeglasses with appropriate computer hardware (e.g. GOOGLE GLASS®) and/or other types of computing devices capable of transmitting and/or receiving data, such as an IPAD® from APPLE®. Although a user device is shown, the user device may be managed or controlled by any suitable processing device. Although only one user device is shown, a plurality of user devices may function similarly.

User device 110 of FIG. 1 contains a voice assistant application 120, a search and payment application 112, other applications 114, a database 116, and a network interface component 118. Voice assistant application 120, search and payment application 112, and other applications 114 may correspond to processes, procedures, and/or applications executable by a hardware processor, for example, a software program. In other embodiments, user device 110 may include additional or different software as required.

Voice assistant application 120 corresponds generally to an application of user device 110 configured to receive voice data including spoken words, and convert the voice data to text, data, or other information usable by one or more applications of user device 110 to present sales transactions to user 102. In this regard, voice recognition application may receive voice data from user 102 and convert the voice data into text, data, and/or other information usable as input in one or more of search and payment application 112 and other applications 114. In various embodiments, voice assistant application 120 may convert voice data to different data than text, for example programming code, where text input is not required. Voice assistant application 120 may include processes to identify spoken words, check syntax and semantic accuracy, correct errors in text translation, and other safeguards for converting voice data to different input data. In certain embodiments, voice assistant application 120 may correspond to SIRI® by APPLE®.

Once voice data has been received and converted by voice assistant application 120, voice assistant application 120 may perform a search utilizing search and payment application 112. Voice assistant application 120 may perform intelligent searching by determining purchase preferences from the voice data, such as items, merchant names, times, and/or other keywords in the voice data, and utilizing the purchase preference with additional parameters about user 102. For example, voice assistant application 120 may pull information from one or more other sources, including an application of user device 110, a database of user device 110, or data available or stored elsewhere, including payment provider server 140. Additional parameters may correspond to merchant preferences, other user's with or associated with user 102, a location of user 102, and/or a monetary preference of user 102 (e.g., a price threshold, a request to search for sale items, etc.). Thus, voice assistant application 120 may access a location application/module of user device 110 (e.g., a GPS module and/or map application), database 116 having set user preferences and/or past user actions (e.g., locations/merchants visited, items purchased, amounts spent, etc.), and/or a database on another server, such as payment provider server 140. Voice assistant application 120 may transmit the search information to search and payment application 112, which may perform a search, as will be discussed in more detail herein.

After receiving the results of the search, voice assistant application 120 may display or present the results to user 102. Voice assistant application 120 may display the results for selection by user 102 in an application interface. In other embodiments, voice assistant application 120 may utilize a speaker of user device 112 to alert user 102 of the results. After providing user 102 with the results, user 102 may select to accept the sales transaction, refine the sales transaction, or decline the sales transaction. If user 102 accepts the sales transaction, voice assistant application 120 may request additional information, including a number of items to purchase, a time for pick-up/redeem an item, a time for visiting a merchant location, etc. Additionally voice assistant application 120 may request payment information from user 102. Payment information may be voice data input by the user. The voice data may include a payment instrument for user 102 (e.g., a payment card, checking account, payment account with payment provider server 140, etc.). In other embodiments, user 102 may specify a payment card, account, etc., stored by search and payment application 112, such as "Pay with my AMERICAN EXPRESS® Card,"

"Pay with my payment account with payment provider server 140," or utilizing a keyword associated with a payment instrument. Thus, if user 102 accepts the transaction, voice assistant application 120 may access user 102's payment account credentials in order to provide a payment instrument. In certain embodiments, user 102 may be required to approve and verify the transaction by entering a password or other security information. Voice assistant application 120 may also compare the sales transaction and/or item in the sales transaction to a user profile or transaction history statement in order to verify the sales transaction.

If a sales transaction is declines, voice assistant application 120 may choose to restart from the beginning, exit a search process, or close. In other embodiments, voice assistant application may restart a search process using the voice data from user 102 but omit any previously presented sales transactions. Moreover, user 102 may choose to refine the sales transaction by providing voice assistant application with additional information. For example, if voice assistant application retrieves a time and location for a movie requested by user 102, user 102 may afterwards request 2 tickets to the movie. Thus, voice assistant application 120 may update the sales transaction and/or perform additional searches, as previously discussed. If the previous sales transaction is not available based the refinement information provided by user 102, another search for a sales transaction may be attempted using search and payment application 112.

Search and payment application 112 may provide search features to user device 110 to locate items for purchase requested by a user. Search and payment application 112 may correspond to a specific merchant (e.g., an application for a marketplace offered by a merchant, such as EBAY®), or may more generally correspond to an application that may search a broad category of items and/or merchants. In other embodiments, search and payment application 112 may correspond to a browser application configured to provide Internet search features. Search and payment application 112 may receive data from voice assistant application 120 having one or more purchase preferences and parameters for user 102 and search for a sales transaction based on the purchase preference(s) with the parameters of user 102. Thus, search and payment application 112 may receive information for a desired item, service, etc. for user 102 (e.g., a movie to view, a meal to purchase, etc.) as well as parameters of user 102 that may be retrieved from other sources (e.g., a location of user 102 from a GPS module of user device 110).

The sales transaction determined by search and payment application 112 and provided to voice assistant application 120 for presentation to user 102 may include an item for purchase corresponding to the purchase preference. The sales transaction may further have a cost and at least one merchant where user 102 may redeem the item from the sales transaction. Search and payment application 112 may perform additional searches if the user declines the first sales transaction or chooses to provide additional data to voice assistant application 120, for example, to refine an initial search. Thus, search and payment application 112 may receive additional purchase preferences, parameters, and/or other data after completing an initial search for a sales transaction.

Search and payment application 112 may be used, for example, to provide a convenient interface to permit user 102 to select payment options and provide payment for items. For example, search and payment application 112 may be implemented as an application having a user interface enabling the user to enter payment options for storage by user device 110, provide payment options on checkout/payment of an item, and complete a transaction for the item. In some embodiments, where search and payment application 112 may correspond more generally to a web browser configured to view information available over the Internet, search and payment application 112 may access a website corresponding to a payment/wallet application, such as payment provider server 140. Search and payment application 112 may receive acceptance of a sales transaction from voice assistant application 120. Additionally, search and payment application 112 may receive a payment instrument (e.g., a payment card, a payment account, etc.) from voice assistant application 120. Once search and payment application 112 receives an acceptance of the sales transaction and the payment instrument to use for completion of the sale transaction, search and payment application 112 may complete the sales transaction and generate a transaction history documenting completion of the transaction. In various embodiments, the transaction history may include information necessary for user 102 to redeem the purchased item.

Search and payment application 112 may further include options to store transaction history for purchased items, such as receipts, for later use. For example, search and payment application 112 may store a receipt for purchased movie tickets that may be redeemable when visiting a merchant. Search and payment application 112 may include a device and/or cloud based digital wallet having transaction histories that may be viewed and utilized by user 102. A cloud based digital wallet may be provided by payment provider server 140 and accessed by search and payment application 112. Thus, search and payment application 112 provides an interface enabling user 102 to provide proof of purchase for an item to a merchant.

In various embodiments, one or more of the features discussed above in reference to voice assistant application 120 and search and payment application 112 may be incorporated in the same application so as to provide their respective features in one convenient application interface.

User device 110 includes other applications 114 as may be desired in particular embodiments to provide features to user device 110. For example, other applications 114 may include security applications for implementing client-side security features, programmatic client applications for interfacing with appropriate application programming interfaces (APIs) over network 160, or other types of applications. Other applications 114 may also include email, texting, voice and IM applications that allow a user to send and receive emails, calls, texts, and other notifications through network 160. In various embodiments, other applications 114 may include financial applications, such as banking, online payments, money transfer, or other applications associated with payment provider server 140. Other applications 114 may include GPS and/or mapping applications to identify user 102 with a location and assist in locating merchant nearby user 102. Additionally, other applications 114 may include social media applications. Other applications 114 may contain other software programs, executable by a processor, including a graphical user interface (GUI) configured to provide an interface to the user.

User device 110 may further include database 116 which may include, for example, identifiers such as operating system registry entries, cookies associated with voice assistant application 120, search and payment application 112, and/or other applications 114, identifiers associated with hardware of user device 110, or other appropriate identifiers, such as identifiers used for payment/user/device authentication or identification. In one embodiment, identifiers in database 116 may be used by a merchant and/or payment provider to associate user device 110 with a particular account maintained by the payment/credit provider.

In various embodiments, database 116 may further include user information, such as user personal information (e.g. a name, social security number, user financial information, or other identifying information). In various embodiments, database 116 may include online account access information. Voice data input by user 102 may be stored in database 116 prior to processing by voice assistant application 120. After processing the voice data, voice assistant application 120 may also utilize database 116 to store user 102's purchase preferences. Database 116 may also store parameters used with purchase preferences to determine a sales transaction. In various embodiments, the parameters may include preferred locations, merchants, items, and/or other user preferences. In some embodiments, database 116 may include a digital wallet having transaction histories stored for later use In various embodiments, user device 110 includes at least one network interface component 118 adapted to communicate with merchant 130 and/or payment provider server 140 over network 160. In various embodiments, network interface component 118 may include a DSL (e.g., Digital Subscriber Line) modem, a PSTN (Public Switched Telephone Network) modem, an Ethernet device, a broadband device, a satellite device and/or various other types of wired and/or wireless communication devices including microwave, radio frequency, infrared, Bluetooth, Bluetooth Low Energy, and near field communication devices. In various embodiments, network interface component 118 may include a communication module for short range communications with merchant 130 including through the aforementioned microwave, radio frequency, infrared, Bluetooth, Bluetooth Low Energy, and near field communications.

Merchant 130 may be maintained, for example, by a merchant or seller offering various items, products, and/or services through a merchant location. Generally, merchant 130 may be maintained by anyone or any entity that receives money, which includes charities as well as retailers and restaurants. In this regard, merchant 130 may include processing applications, which may be configured to interact with user device 110 and/or payment provider server 140 to facilitate the sale of products, goods, and/or services.

Merchant 130 may be include any appropriate hardware and software configured for wired and/or wireless communication with user device 110 and/or payment provider server 140. For example, in one embodiment, merchant 130 may include a single or networked personal computer (PC), a smart phone, laptop computer, and/or other types of computing devices at a merchant location capable of transmitting and/or receiving data. Although a merchant is shown, the merchant may be managed or controlled by any suitable processing device. Although only one merchant is shown, a plurality of merchants may function similarly.

Merchant 130 includes a sales application 132, other applications 134, a database 136, and a network interface component 138. Sales application 132 and other applications 134 may correspond to processes, procedures, and/or applications executable by a hardware processor, for example, a software program. In other embodiments, merchant 130 may include additional or different software as required.

Sales application 132 may be configured to provide sales information for items and/or services available with merchant 130 and provide the sales information to user device 110 and/or payment provider server 140. In this regard, sales application 132 may access and provide an inventory of items available with merchant 130 and pricing for those items. The sales information may be used by payment provider server 140 to generate sale transactions. Sales application 132 may further provide information about merchant 130, including a location, available discounts, etc., which may be matched with user 102's purchase preferences and/or parameters. Thus, sales application 132 may include information utilized by payment provider server 140 to provide user 102 with sale transactions for items offered by merchant 130.

Sales application 132 may also be configured to provide a convenient interface to permit a salesperson to complete a transaction for an item with user 102. For example, sales application 132 may be implemented as an application having an interface enabling user 102 to purchase items and/or pick-up/redeem previously purchased items available at merchant 130. Sales application 132 may include an interface displaying user purchased items and terms of purchase (e.g. time, date, number, sale price, etc.). In some embodiments, sales application 132 may correspond more generally to a web browser configured to view merchant information available over the Internet or access a website corresponding to purchasable items from merchant 130. Sales application 132 may also be utilized to access merchant websites and engage in online transactions, for example, checking/finding inventory purchased by a user available at the merchant location or different merchant locations.

Sales application 132 may further complete payment for one or more of those items with user 102. Payment provider server 140 may provide payment processing and transfer of funds between user 102 and merchant 130. Completion of a payment with user 102 may generate a transaction history that may be transmitted to user device 110 and/or payment provider server 140. The transaction history may be stored in a digital wallet on user device 110 or in a cloud based digital wallet with payment provider server 140. Although payment provider server 140 is shown in FIG. 1 as generating sales transactions for transmission to user 102 based on information received from user device 110, in various embodiments, merchant 130 may generate sales transactions for user 102. In various embodiments, sales application 132 may include processes to transmit a notification to user device 110 and/or payment provider server 140 notifying the entities that a previously purchased item has been redeemed by user 102. Thus, sales application 132 may update a digital wallet having transaction histories for user 102.

In various embodiments, merchant 130 includes other applications 134 as may be desired in particular embodiments to provide features to merchant 130. For example, other applications 134 may include security applications for implementing device/server-side security features, programmatic server applications for interfacing with appropriate application programming interfaces (APIs) over network 160, or other types of applications. Other applications 134 may contain software programs, executable by a processor, including a graphical user interface (GUI), configured to provide an interface to a user. In some embodiments, other application 134 may include applications providing features discussed in reference to payment provider server 140, such as transaction generation applications.

Additionally, merchant 130 includes database 136. Database 136 may include merchant inventory, sales, and/or location information. For example, database 136 may include information about available items with merchant 130. Additionally, database 136 may include information about merchant locations where user 102 may visit. In other embodiments, database 136 may include shipping information for available shipping items and/or services and shipping information for user 102 (e.g., a physical address). After completing payment for an item, database 136 may include transaction history information.

In various embodiments, merchant 130 includes at least one network interface component 138 adapted to communicate with user device 110 and/or payment provider server 140 over network 160. In various embodiments, network interface component 138 may comprise a DSL (e.g., Digital Subscriber Line) modem, a PSTN (Public Switched Telephone Network) modem, an Ethernet device, a broadband device, a satellite device and/or various other types of wired and/or wireless communication devices including microwave, radio frequency, infrared, Bluetooth, Bluetooth Low Energy, and near field communication devices. In various embodiments, network interface component 138 may include a communication module for short range communications with user device 110 including through the aforementioned microwave, radio frequency, infrared, Bluetooth, Bluetooth Low Energy, and near field communications.

Payment provider server 140 may be maintained, for example, by an online payment service provider, which may generate sales transactions and provide payment services to user 102. In this regard, payment provider server 140 includes one or more processing applications which may be configured to interact with user device 110 and/or merchant 130 to generate a sales transaction based on user 102's purchase preferences and parameters, facilitate purchase of one or more items, and coordinate pick-up/redemption of the item(s) at a merchant location. In one example, payment provider server 140 may be provided by PAYPAL®, Inc. of San Jose, Calif., USA. However, in other embodiments, payment provider server 140 may be maintained by or include a merchant, financial services provider, and/or other service provider, which may provide user account and payment service to user 102. For example, transaction generation features may be provided by EBAY®, Inc. of San Jose, Calif., USA, in conjunction with an offered marketplace for selling items. Although payment provider server 140 is described as separate from merchant 130, it is understood one or more of the features described below in reference to payment provider server 140 may be incorporated within merchant server 130, and vice versa.

Payment provider server 140 of FIG. 1 includes a transaction generation application 150, a transaction processing application 142, other applications 144, a database 146, and a network interface component 148. Transaction generation application 150, transaction processing application 142, and other applications 144 may correspond to processes, procedures, and/or applications executable by a hardware processor, for example, a software program. In other embodiments, payment provider server 140 may include additional or different software as required.

Transaction generation application 150 may correspond to an application configured to receive and/or access user purchase preferences determined from voice data input by user 102, and generate one or more sales transactions for user 102 based on additional parameters for user 102. In this regard, transaction generation application 150 may receive purchase preferences from user device 110 after user device 110 determines the purchase preferences from voice data input by user 102, as previously discussed. However, in certain embodiments, transaction generation application 150 may receive the voice data and determine the purchase preferences, for example, if user device 110 does not include voice recognition and/or processing applications. Thus, in certain embodiments, transaction generation application 150 may include voice processing applications, features, and/or procedures, as previously discussed in reference to voice assistant application 120.

Once transaction generation application 150 receives and/or accesses user 102's purchase preference(s), transaction generation application 150 may receive and/or access parameters for user 102. As previously discussed, parameters for user 102 may include a location for user 102, another user with user 102, a merchant preference for user 102, a price preference for user 102, and/or other informational data for user 102. The parameter(s) may be utilized to more narrowly search for item sales transactions using the purchase preference(s). Once transaction generation application 150 has both the purchase preference(s) and the parameter(s), transaction generation application 150 may determine a sales transaction having at least one item for sale from a merchant. Transaction generation application 150 may access and/or receive item sale information for items offered by merchant 130 (e.g., price, description, etc.), inventory information for merchant 130, location and/or description (store biography, reviews, etc.) information for merchant 130, or other information necessary to generate a sales transaction. Transaction generation application 150 may then communicate the sales transaction to user 102, for example, through user device 110.

Transaction processing application 142 may be configured to receive information from user device 110 and/or merchant 130 for processing and completion of financial transactions, including financial transactions to complete a sales transaction offered to user 102. Thus, transaction processing application 142 may include one or more applications to process financial transaction information from user device 110 and/or merchant server 130. Transaction processing application 142 may complete the sales transaction by providing payment to merchant 130. Transaction processing application 142 may receive a user payment account for user 102 with payment provider server 140 to provide payment to merchant 130. In other embodiments, transaction processing application 142 may receive user financial information, such as a payment card, bank account, gift card, or other financial instrument. Transaction processing application 142 may authenticate that payment has been approved and verified by user 102 through a password for user 102's payment account, a card security number, a signature, or other verification means. In certain embodiments, transaction processing application 142 may verify the authenticity of the payment by confirming the sales transaction and/or item in the sales transaction is the same or similar to past purchases by user 102 (e.g., through a user profile or transaction history statement). Transaction processing application 142 may credit the payment to a payment account of merchant 130 with payment provider server 140 or to another financial account, such as a bank account. In other embodiments, transaction processing application 142 may provide transaction histories, including receipts, to user device 110 and/or merchant 130 in order to provide proof or purchase and complete the financial transaction.

In various embodiments, payment provider server 140 includes other applications 144 as may be desired in particular embodiments to provide features to payment provider server 140. For example, other applications 144 may include security applications for implementing server-side security features, programmatic server applications for interfacing with appropriate application programming interfaces (APIs) over network 160, or other types of applications. Other applications 144 may contain software programs, executable by a processor, including a graphical user interface (GUI), configured to provide an interface to a user.

Additionally, payment provider server 140 includes database 146. User 102 and/or merchant 130 may establish one or more user accounts with payment provider server 140 (e.g., a payment account to send and receive funds). User accounts in database 146 may include user/merchant information, such as name, address, birthdate, payment/funding information, additional user financial information, and/or other user data. User 102 and/or merchant 130 may link to user accounts through an identifier. Thus, when an identifier corresponding to user 102 (including one corresponding to user device 110) and/or merchant 130 is transmitted to payment provider server 140, e.g. from user device 110 and/or merchant 130, a user account belonging to user 102 may be found. In various embodiments, user 102 and/or merchant 130 may not have previously established a user account for payment services and may provide other financial information to payment provider server 140 to complete financial transactions, as previously discussed. Database 146 may further include information received from user device 110 and/or merchant 130, including user 102's purchase preference(s), parameter(s) for user 102, item and/or merchant information for merchant 130, etc.

In various embodiments, payment provider server 140 includes at least one network interface component (NIC) 148 adapted to communicate with user device 110 and/or merchant 130 over network 160. In various embodiments, network interface component 148 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 160 may be implemented as a single network or a combination of multiple networks. For example, in various embodiments, network 160 may include the Internet or one or more intranets, landline networks, wireless networks, and/or other appropriate types of networks. Thus, network 160 may correspond to small scale communication networks, such as a private or local area network, or a larger scale network, such as a wide area network or the Internet, accessible by the various components of system 100.

Figure 2:
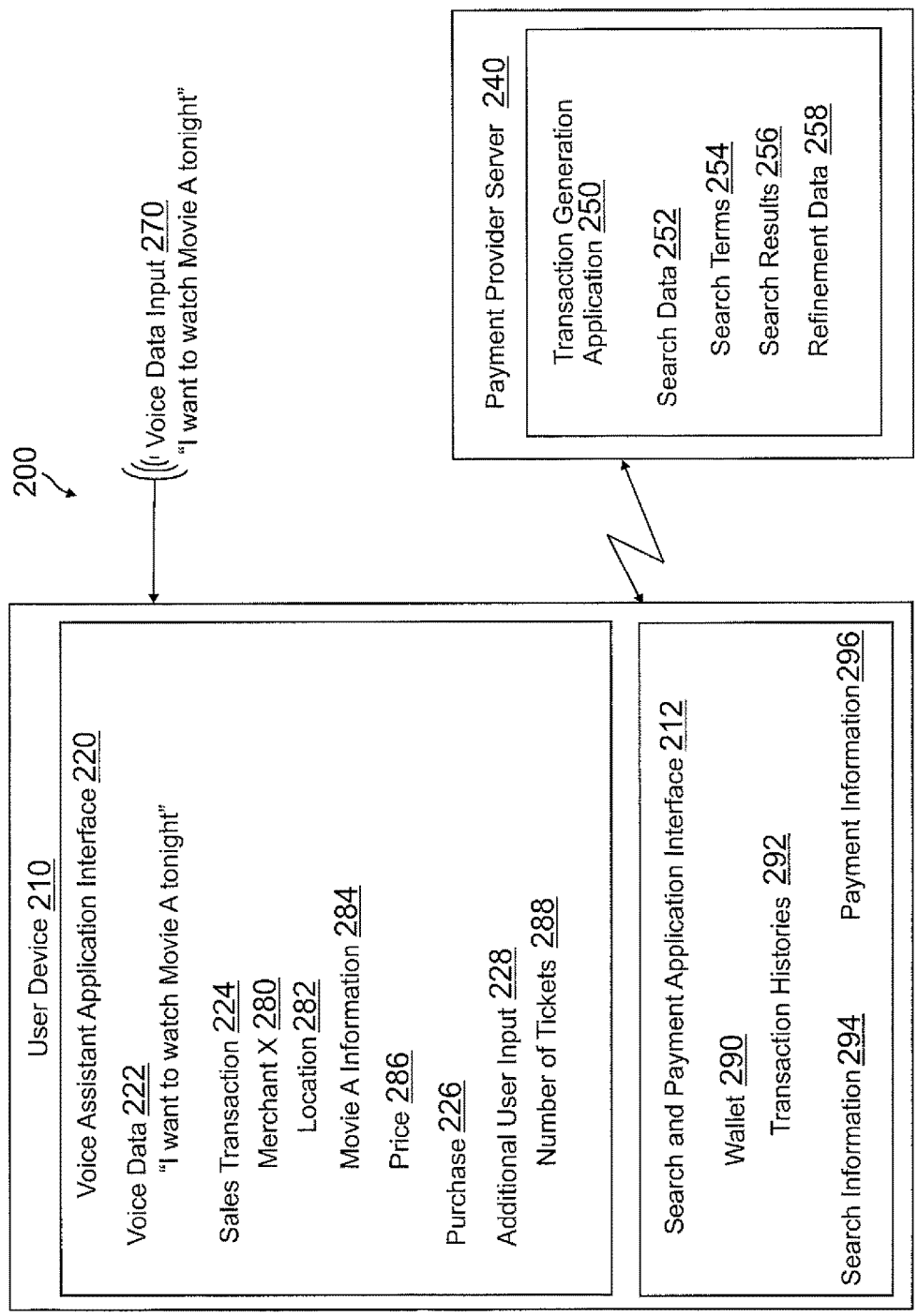
FIG. 2 is an exemplary device display screen showing a sale transaction generated from voice data input by a user; according to an embodiment.

FIG. 2 is an exemplary device display screen showing a sales transaction generated from voice data input by a user, according to an embodiment. FIG. 2 includes a user device 210 and a payment provider server 240 corresponding generally to user device 110 and payment provider server 140, respectively, of FIG. 1.

User device 210 displays a voice assistant application interface 220 that may receive a voice data input 270, such as voice input by a user (not shown) of user device 210. Voice assistant application interface 220 may correspond to an interface displaying similar executed processes and procedures of voice assistant application 120 of FIG. 1. Voice data input 270 includes speech input by the user of "I want to watch movie A tonight." After user device receives voice data input 270, voice assistant application interface 220 may populate voice data 222 that displays the voice text input through voice data input 270. Thus, as shown in FIG. 2, voice data 222 displays "I want to watch movie A tonight." Voice data 222 enables the user to view voice assistant application interface 220 and ensure that the correct voice data was input to user device 210.

Once user device 210 receives voice data input 270, the voice assistant application corresponding to voice assistant application interface 220 may determine the user's purchase preferences from voice data input 270, as previously discussed. Thus, the voice assistant application may include voice recognition and processing procedures, or may transmit the voice data to payment provider server 240 for analysis. Once the user's purchase preferences are determined, the voice assistant application executing on user device 210 may retrieve parameters for the user of user device 210, such as a location of the user. The purchase preferences and the parameters for the user are transmitted to payment provider server 240.

Payment provider server 240 executes transaction generation application 250 to determine one or more sales transactions corresponding to the purchase preferences and parameters for the user of user device 210. Transaction generation application 250 may correspond generally to transaction generation application 150 of FIG. 1. Transaction generation application 250 may utilize search data 252, which may correspond to purchase preferences for the user of user device 210 or voice data 222, as previously discussed. For example, search data 252 may include the purchase preferences of the user when a voice assistant application corresponding to voice assistant application interface 220 performs voice analysis on voice data input 270. However, as previous discussed, in certain embodiments user device 210 may directly transmit voice data 222 to payment provider server 240 without performing voice analysis. Thus, in those embodiments, search data 252 may correspond directly to voice data 222, which be analyzed by payment provider server 250 to determine the purchase preferences. Additionally, search data 252 may include parameters for user 102, as previously discussed.

Based on search data 252, transaction generation application 250 of payment provider server 240 may determine a set of search terms 254. Search terms 254 may be utilized to search for one or more sales transactions corresponding to search data 252. For example, if search data 252 includes "Movie A" and a location B determined by user device 210 (e.g., through a GPS module of user device 210), search terms 254 may correspond to "Movie A at theaters near location B." Search terms 254 may also include price preferences, merchant preferences, etc.

Once search terms 254 are utilized in a search for an item matching search terms 254, payment provider server 240 may receive search results 256. Search results 256 may include sales transactions matching search data 252. Sales transactions from search results 256 may be transmitted to user device 210 for display to a user corresponding to user device 210. Thus, voice assistant application interface 220 may display sales transaction 224 corresponding to a sales transaction for an item in search results 256. Sale transactions 224 may display information to the user, including a merchant X 280, a location 282 for merchant X 280, Movie A information 284, and a price 286. Merchant X 280 may display a name of the merchant offering sales transaction 224. Thus, location 282 may display further information for merchant X, including a location for merchant X. Movie A information 284 may comprise information for Movie A that the user wishes to view, including a time Movie A starts, available seating, rating, description, etc. Additionally, sales transaction 224 includes price 286 having an amount it will cost the user to accept sales transaction 224.

Voice assistant application interface 220 may further display a purchase 226 button and additional user input 228. Purchase 226 button may correspond to a process to accept sales transaction 224. Thus, selection of purchase 226, either through touch input, use of an input/output device (e.g., keyboard or mouse), or through additional voice data input, may cause user device 210 to complete a financial transaction to accept sales transaction 224. However, in other embodiments, the user of user device 210 may wish to refine sales transaction 224. For example, the user may wish to request additional tickets, or find another time to view Movie A. In certain embodiments, the user may wish to engage in an entirely new sales transaction. Thus, additional user input 228 includes refinement and/or new data that may be used to refine a search for a sales transaction or start a whole new search. In FIG. 2, additional user input 228 includes number of tickets 288 corresponding to a number of tickets specified by the user to purchase in sales transaction 224. User device 210 may confirm number of tickets 288 are available with the merchant through payment provider server 240. Thus, additional user input 228 is transmitted to payment provider server 240 and used by transaction generation application 250 to inquire as to the number of available tickets with the merchant. A shown, transaction generation application 250 includes number of tickets 288 as refinement data 258. Refinement data 258 is then used with search terms 254 to generate an updated sales transaction for display to the user. Once transmitted to user device 210, voice assistant application interface 220 may update sales transaction 224, including price 286. If the user now accepts sales transaction 224 through purchase 226 button, a financial transaction for sales transaction 224 may be completed and a transaction history may be generated showing proof of payment.

The transaction history generated by completion of sales transaction 224 may be stored to a digital wallet available either in a database of user device 210 or stored with a cloud service offering digital wallet services. Thus, search and payment application interface 212 may display the digital wallet to the user of user device 210. Search and payment application interface 212 may correspond to an interface displaying similar executed processes and procedures of search and payment application 120 of FIG. 1. Search and payment application interface 212 displays a wallet 290 having transaction histories 292. Wallet 290 may correspond to the digital wallet of the user, and enable the user to view transaction histories 292, include the completed transaction history for sales transaction 224. Moreover, in certain embodiments, search and payment application interface 212 may display search information 294 and/or payment information 296. Search information 294 may include both purchase preferences and/or parameters for the user. Payment information 296 may display the currently selected and/or all the available payment instruments for use in completing sales transaction 224.

Figure 3:
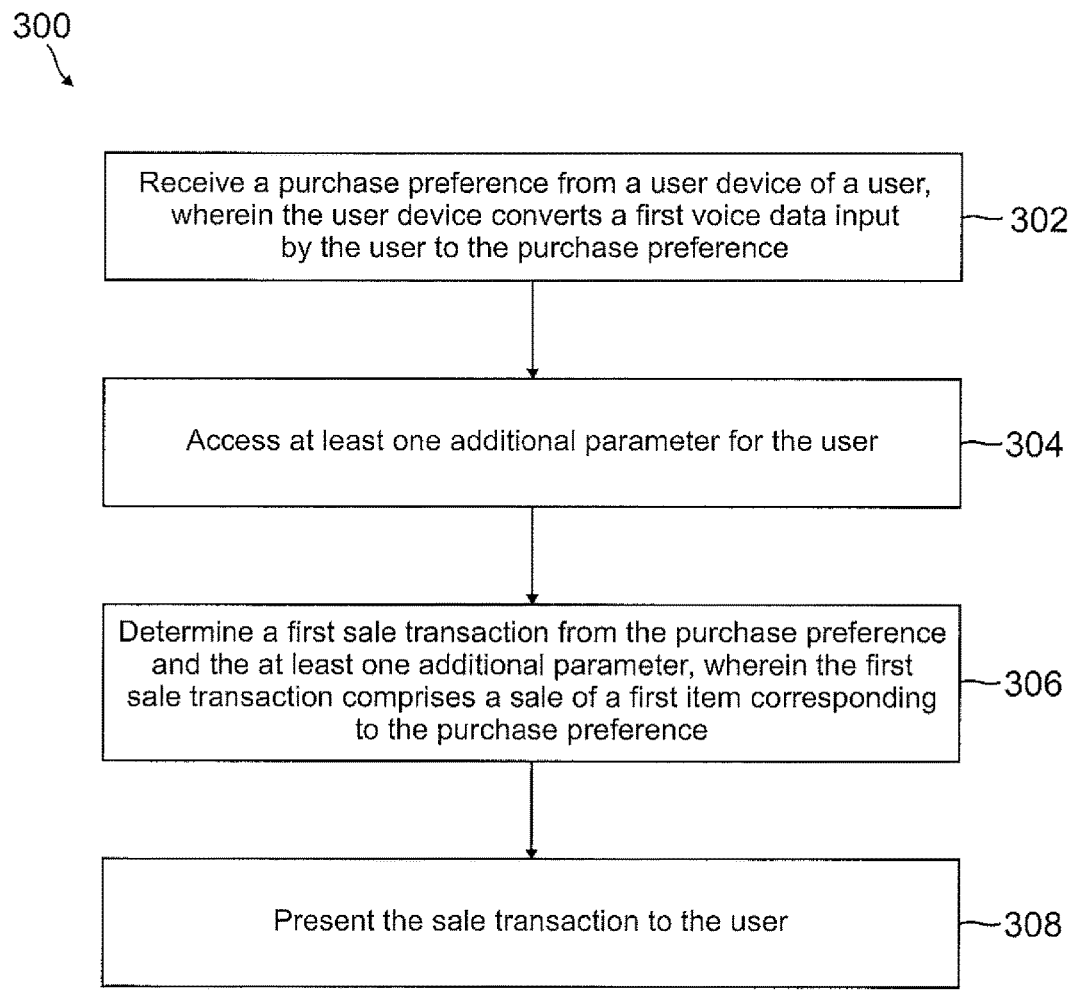
FIG. 3 is a flowchart of an exemplary process for generating a sale transaction from voice data input by a user, according to an embodiment.

FIG. 3 is a flowchart of an exemplary process for generating a sales transaction from voice data input by a user, according to an embodiment. Note that one or more steps, processes, and methods described herein may be omitted, performed in a different sequence, or combined as desired or appropriate.

At step 302, a purchase preference is received from a user device of a user, wherein the user device converts voice data input by the user to the purchase preference. The first voice data may be received by a voice recognition application and may be processed to determine text and/or other data input. Thus, after processing the first voice data, the purchase preference may be determined, such as a request to purchase an item (e.g. food, products, or services) from a merchant. The first voice data may further include a location or other user preferences, such as a time, number of items, merchant, etc.

At least one parameter for the user is accessed, at step 304. The at least one parameter may comprise at least one of location of the user, a monetary preference of the user, at least one additional user associated with the user, and/or a merchant preference of the user. The at least one parameter may be accessed from at least one of a location module of the user device, a database of the user device, and a server database comprising user information for the user.

A first sales transaction is determined from the purchase preference and the at least one parameter, wherein the first sales transaction comprises a sale of a first item corresponding to the purchase preference, at step 306. A first sales transaction may correspond to an offer to sell a first item corresponding to the item purchase preference. In some embodiments, the first sale transaction may further comprise a discount offer corresponding to the purchase preference. For example, a merchant may offer 20% off an item if the user accepts the sales transaction. The first sales transaction may include at least one merchant location corresponding to the item. The at least one merchant location my further correspond to a location of the user. The first item may comprise one of a food item at a merchant location, a preordered item, an event ticket, a movie ticket, and a service from a merchant.

At step 308, the first sales transaction is presented to the user. The user may view the first sales transaction on a user device. In various embodiments, the first sales transaction may also be presented to the user through audio means, such as a speaker of a user device. If the user wishes to complete the first sales transaction, the user may accept the first sales transaction, for example, using a second voice data. The first sales transaction may be completed using a payment provider.

However, in other embodiments, the first sales transaction may not meet the user's preferences. A time, location, item, and/or price may not meet the user's expectations. Thus, the user may decline the first sales transactions using a third voice data. If the user declines the first sales transactions, a second sales transaction may be determined for a second item. The second sales transaction may be determined using the purchase preference and/or the at least one parameter. Thus, the second sales transaction may correspond to a different price, a different location, and/or a different merchant. The second item may correspond to a similar item to the first item, for example, movie tickets to the same or similar movie. However, in other embodiments, the second item may correspond to a different item chosen from the first data, such as movie tickets to a different movie, different food choices, different movie rentals, or other events occurring in the same time frame. In certain embodiments, the second sales transaction may be generated using entirely new purchase preferences and/or parameters.

Figure 4:
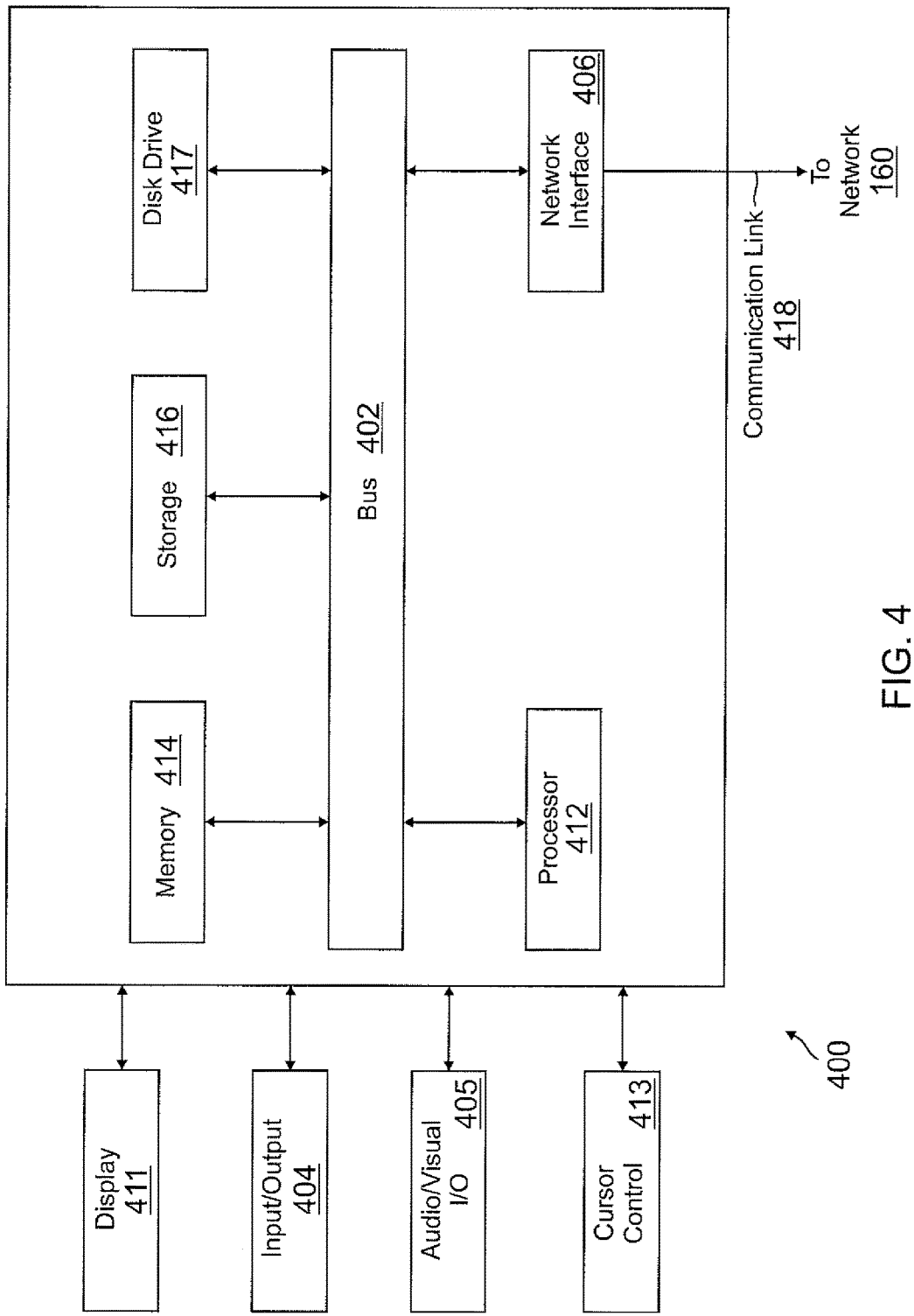
FIG. 4 is a block diagram of a computer system suitable for implementing one or more components in FIG. 1, according to an embodiment.

FIG. 4 is a block diagram of a computer system suitable for implementing one or more components in FIG. 1, according to an embodiment. In various embodiments, the user device may comprise a personal computing device (e.g., smart phone, a computing tablet, a personal computer, laptop, a wearable computing device, Bluetooth device, key FOB, badge, etc.) capable of communicating with the network. The merchant server and/or service provider may utilize a network computing device (e.g., a network server) capable of communicating with the network. It should be appreciated that each of the devices utilized by users and service providers may be implemented as computer system 400 in a manner as follows.

Computer system 400 includes a bus 402 or other communication mechanism for communicating information data, signals, and information between various components of computer system 400. Components include an input/output (I/O) component 404 that processes a user action, such as selecting keys from a keypad/keyboard, selecting one or more buttons, image, or links, and/or moving one or more images, etc., and sends a corresponding signal to bus 402. I/O component 404 may also include an output component, such as a display 411 and a cursor control 413 (such as a keyboard, keypad, mouse, etc.). An optional audio input/output component 405 may also be included to allow a user to use voice for inputting information by converting audio signals. Audio I/O component 405 may allow the user to hear audio. A transceiver or network interface 406 transmits and receives signals between computer system 400 and other devices, such as another user device, a merchant server, or a service provider server via network 160. In one embodiment, the transmission is wireless, although other transmission mediums and methods may also be suitable. One or more processors 412, which can be a micro-controller, digital signal processor (DSP), or other processing component, processes these various signals, such as for display on computer system 400 or transmission to other devices via a communication link 418. Processor(s) 412 may also control transmission of information, such as cookies or IP addresses, to other devices.

Components of computer system 400 also include a system memory component 414 (e.g., RAM), a static storage component 416 (e.g., ROM), and/or a disk drive 417. Computer system 400 performs specific operations by processor(s) 412 and other components by executing one or more sequences of instructions contained in system memory component 414. Logic may be encoded in a computer readable medium, which may refer to any medium that participates in providing instructions to processor(s) 412 for execution. Such a medium may take many forms, including but not limited to, non-volatile media, volatile media, and transmission media. In various embodiments, non-volatile media includes optical or magnetic disks, volatile media includes dynamic memory, such as system memory component 414, and transmission media includes coaxial cables, copper wire, and fiber optics, including wires that comprise bus 402. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 400. In various other embodiments of the present disclosure, a plurality of computer systems 400 coupled by communication link 418 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system comprising:
   a non-transitory memory; and
   one or more hardware processors coupled to the non-transitory memory and configured to read instructions from the non-transitory memory to cause the system to perform operations comprising:
      receiving a first voice data input by a user using a voice input component with a first application executing on a user device of the user;
      converting the first voice data input to text data using a voice processing operation of the first application:,
      determining a purchase preference for the user based on the text data
      determining a location of the user device through a GPS component of the user device;
      generating a search query for a second application on the user device that is separate from the first application;
      submitting, by the first application, the search query to the second application;
      executing a search in the second application based on the search query without requiring user input to the second application;
      in response to the search executed by the second application, receiving, by the first application, a first item and a first purchase location for the first item based on the purchase preference and the location;
      determining a parameter for the user associated with the purchase preference;

refining the search with the second application based on the parameter without requiring the user input to the second application;

in response to refining the search, determining a second purchase location for the first item based on one or more past items purchased by the user, the purchase preference, and the parameter;

generating user interface data for a first sales transaction comprising a first sale of the first item corresponding to the purchase preference for the second purchase location; and outputting the user interface data to the user through an application interface of the first application.

2. The system of claim 1, wherein the operations further comprise:

completing the first sales transaction if the user accepts the first sales transaction.

3. The system of claim 2, wherein the first sales transaction is completed using a payment provider.

4. The system of claim 2, wherein the user accepts the first sales transaction using a second voice data input.

5. The system of claim 4, wherein the second voice data input comprises a vocal input of a payment instrument selected by the user, and wherein the operations further comprise:

determining the payment instrument selected by the user in the second voice data input using the voice processing operation; and identifying payment instrument data for the payment instrument in an account of the user.

6. The system of claim 1, wherein the operations further comprise:

determining a second sales transaction from the purchase preference and the parameter if the user declines the first sales transaction, wherein the second sales transaction comprises a second sale of a second item corresponding to the purchase preference and the parameter; and presenting the second sales transaction through the user device.

7. The system of claim 1, wherein the parameter comprises at least one of a monetary preference of the user, an additional user associated with the user, or a merchant preference of the user.

8. The system of claim 1, wherein parameter is determined from at least one of a database of the user device or a server database comprising user information for the user.

9. The system of claim 1, wherein the first item comprises one of a food item at a merchant location, a preordered item, an event ticket, a movie ticket, or a service from a merchant.

10. The system of claim 1, wherein the past items purchased include past visited locations for the past items purchased, and wherein the second purchase location comprises one of the past visited locations.

11. A method comprising:

receiving a first voice data input by a user using a voice input component with a first application executing on a user device of the user;

converting the first voice data input to text data using a voice processing operation of the first application;

determining a purchase preference for the user based on the text data;

determining a location of the user device through a GPS component of the user device;

generating a search query for a second application on the user device that is separate from the first application;

submitting, by the first application, the search query to the second application;

executing a search with the second application using the search query without requiring user input to the second application;

in response to the search executed by the second application, receiving, by the first application, a first item and a first purchase location for the first item based on the purchase preference and the location;

determining a parameter for the user associated with the purchase preference;

refining the search in the second application based on the parameter without requiring the user input to the second application;

in response to refining the search, determining a second purchase location for the first item based on one or more past items purchased by the user, the purchase preference, and the parameter;

generating, using one or more hardware processors, user interface data for a first sales transaction comprising a first sale of the first item corresponding to the purchase preference for the second purchase location; and outputting the user interface data to the user through an application interface of the first application.

12. The method of claim 11, further comprising:

completing the first sales transaction if the user accepts the first sales transaction.

13. The method of claim 11, further comprising:

determining a second sales transaction from the purchase preference and the parameter if the user declines the first sales transaction, wherein the second sales transaction comprises a second sale of a second item corresponding to the purchase preference and the parameter; and presenting the second sales transaction through the user device.

14. The method of claim 11, wherein the parameter comprises at least one of a monetary preference of the user, an additional user associated with the user, or a merchant preference of the user.

15. The method of claim 11, further comprising:

presenting a plurality of payment instruments to the user for completing the first sales transaction, wherein the plurality of payment instruments are presented as selectable options within the application interface of the first application.

16. A non-transitory machine-readable medium having stored thereon machine-readable instructions executable to cause a machine to perform operations comprising:

receiving a first voice data input by a user using a voice input component with a first application executing on a user device of the user;

converting the first voice data input to text data using a voice processing operation of the first application;

determining a purchase preference for the user based on the text data;

determining a location of the user device through a GPS component of the user device;

generating a search query for a second application on the user device that is separate from the first application;

submitting, by the first application, the search query to the second application;

executing a search with the second application using the search query without requiring user input to the second application;

in response to the search executed by the second application, receiving, by the first application, a first item and a first purchase location for the first item based on the purchase preference and the location;

determining a parameter for the user associated with the purchase preference;

refining the search in the second application based on the parameter without requiring the user input to the second application;

in response to refining the search, determining a second purchase location for the first item based on one or more past items purchased by the user, the purchase preference, and the parameter;

generating user interface data for a first sales transaction comprising a sale of the first item corresponding to the purchase preference for the second purchase location; and outputting the user interface data to the user through an application interface of the first application.

17. The non-transitory machine-readable medium of claim 16, wherein the operations further comprise:

completing the first sales transaction if the user accepts the first sales transaction.

18. The non-transitory machine-readable medium of claim 16, wherein the operations further comprise:

determining a second sales transaction from the purchase preference and the parameter if the user declines the first sales transaction, wherein the second sales transaction comprises a second sale of a second item corresponding to the purchase preference and the parameter; and presenting the second sales transaction through the user device.

19. The non-transitory machine-readable medium of claim 18, wherein the user declines the first sales transaction using a third voice data input.

20. The non-transitory machine-readable medium of claim 16, wherein the parameter comprises at least one of a monetary preference of the user, at least one additional user associated with the user, or a merchant preference of the user.

* * * * *